United States Patent
Chung et al.

(10) Patent No.: US 8,335,200 B2
(45) Date of Patent: Dec. 18, 2012

(54) DEVICE AND METHOD FOR SEPARATION/CONVERSION OF MULTIBAND SIGNAL

(75) Inventors: Yong Duck Chung, Daejeon (KR); Kwang Seong Choi, Seoul (KR); Jae Sik Sim, Daejeon (KR); Yong Hwan Kwon, Daejeon (KR); Sung Bok Kim, Daejeon (KR); Je Ha Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 348 days.

(21) Appl. No.: 12/676,749

(22) PCT Filed: May 23, 2008

(86) PCT No.: PCT/KR2008/002893
§ 371 (c)(1),
(2), (4) Date: Mar. 5, 2010

(87) PCT Pub. No.: WO2009/044984
PCT Pub. Date: Apr. 9, 2009

(65) Prior Publication Data
US 2010/0246451 A1 Sep. 30, 2010

(30) Foreign Application Priority Data
Oct. 5, 2007 (KR) .................. 10-2007-0100496

(51) Int. Cl.
*H04H 1/00* (2006.01)

(52) U.S. Cl. ................. 370/339; 386/307; 455/130

(58) Field of Classification Search ............. 370/307; 386/307; 455/130
See application file for complete search history.

(56) References Cited

U.S. PATENT DOCUMENTS
2006/0045525 A1  3/2006 Lee et al.

FOREIGN PATENT DOCUMENTS

| JP | 05-327569 | * | 12/1993 |
| JP | 05-327569 | A | 12/1993 |
| JP | 08-237730 | A | 9/1996 |
| JP | 2005-244826 | A | 9/2005 |
| JP | 2005-354336 | A | 12/2005 |
| JP | 2005354336 | A | * 12/2005 |
| JP | 2006-067603 | A | 3/2006 |
| KR | 10-0651544 | B1 | 11/2006 |
| KR | 2007-0025572 | A | 3/2007 |

OTHER PUBLICATIONS

C. T. Lin et al., "Hybrid optical access network integrating fiber-to-the-home and radio-over-fiber systems," IEEE Photon. Technol. Lett., vol. 19, No. 8, pp. 610-612, Apr. 15, 2007.
Kim, Byungjik et al., "Demonstration of Radio over Fiber System for Wireless Multi Services".

* cited by examiner

*Primary Examiner* — Jianye Wu
*Assistant Examiner* — Wanda Z Russell
(74) *Attorney, Agent, or Firm* — Rabin & Berdo, P.C.

(57) ABSTRACT

Provided are a method and device for separating and converting multiband signals. The device includes a photoelectric converter for converting an externally received optical signal into an electrical signal, a first switch for separating the converted electrical signal into signals according to frequency bands, a first mobile communication band-pass amplifier for amplifying a mobile communication network signal of the signals separated by the first switch, a broadband up-converter for up-converting a baseband signal of the signals separated by the first switch into a broadband signal, a first broadband amplifier for amplifying the broadband signal output from the broadband up-converter, and a transmitter for wirelessly transmitting the signals amplified by the first mobile communication band-pass amplifier and the first broadband amplifier.

18 Claims, 4 Drawing Sheets

DEVICE AND METHOD FOR SEPARATION/CONVERSION OF MULTIBAND SIGNAL

TECHNICAL FIELD

The present invention relates to a method and device for separating and converting multiband signals, and more particularly, to a method and device for separating and converting multiband signals received via an optical network to a frequency band.

This work was supported by the IT R&D Program of MIC (Ministry of Information and Communication—Republic of Korea)/IITA (Institute for Information Technology Advancement—Republic of Korea)[2005-s-039-03, SoP (System on Package) for 60 GHz Pico cell communication].

BACKGROUND ART

With the development of mobile communication technologies, the use of wired-based wireless technologies is being considered in order to construct broadband wireless access systems in the fields of broadband convergence networks (BcNs), mobile communications, and telematics.

Although research into various carrier frequencies and data modulation techniques has progressed to provide broadband wireless services, an access technique for directly utilizing conventional powerful wired networks has not yet developed.

Nowadays, much attention has been concentrated on standardization of new services due to a technical limit for making conventional wireless services more broadband. In particular, current wireless services provide a forward rate of 54 Mbps in the frequency band of 2.4 GHz (IEEE 802.11g) and are standardized such that IEEE 802.16m delivers speeds up to 1 Gbps. In addition, IEEE802.15.3c (Wireless Personal Network (WPAN)), ETSI/BRAN (Wireless LAN (WLAN)), ISO/TC 204 WG16 (Inter Vehicle Communication (IVC), Roadside Vehicle Communication (RVC)), and ECMA/ISO are standardized in the millimeter bands.

However, when constructing networks for various conventional wireless services, different wireless access systems are used in different frequency bands, thus increasing system construction and maintenance costs. Also, separate construction of the various wireless services is disadvantageous in terms of efficiency.

Therefore, the need for multiband separation and conversion techniques for supporting all multiband wireless communications with a single conversion device is increasing in order to cope with wireless services that are hereinafter developed.

DISCLOSURE OF INVENTION

Technical Problem

The present invention is directed to a method and device for separating and converting multiband signals.

Also, the present invention is directed to a method and device for separating and converting multiband signals using optical communication networks.

Furthermore, the present invention is directed to a method and device for separating and converting multiband signals, which can expand service regions to, for example, WLAN, Wibro/4G, satellite digital multimedia broadcasting (DMB), and UWB services, irrespective of the format of input/output signals.

In addition, the present invention is directed to a method and device for separating and converting multiband signals, which can transceive broadband data using conventional wired networks and provide multiband wireless services.

Technical Solution

One aspect of the present invention provides a multiband signal separation/conversion device including: a photoelectric converter for converting an externally received optical signal into an electrical signal; a first switch for separating the converted electrical signal into signals according to frequency bands; a first mobile communication band-pass amplifier for amplifying a mobile communication network signal of the signals separated by the first switch; a broadband up-converter for up-converting a baseband signal of the signals separated by the first switch into a broadband signal; a first broadband amplifier for amplifying the broadband signal output from the broadband up-converter; and a transmitter for wirelessly transmitting the signals amplified by the first mobile communication band-pass amplifier and the first broadband amplifier.

The device may further include: a receiver for externally receiving a multiband wireless signal; a second switch for separating the signal received by the receiver into signals according to frequency bands; a second mobile communication band-pass amplifier for amplifying a mobile communication network signal of the signals separated by the second switch; a broadband down-converter for down-converting a broadband signal of the signals separated by the second switch into a baseband signal; a second broadband amplifier for amplifying the baseband signal output from the broadband down-converter; and an electro-optical converter for converting the amplified baseband signal into an optical signal.

Both the optical signal received by the photoelectric converter and the optical signal transmitted from the electro-optical converter may be input or output through the same optical fiber bundle using an optical duplexer. Also, the first switch may analyze the received electrical signal and divide the signal according to a predetermined data format. The first mobile communication band-pass amplifier may increase only the amplitude of the received signal. The broadband up-converter may modulate the input baseband signal according to a predetermined broadband standard.

The receiver and the transmitter may receive and transmit signals through a single antenna using a duplexer. The second switch may analyze the received signal and divide the received signal according to a predetermined data format. The broadband down-converter may demodulate the input broadband signal according to a predetermined broadband standard.

Another aspect of the present invention provides a method of separating and converting a multiband signal. The method includes: externally receiving at least one optical signal; converting the received optical signal into an electrical signal; analyzing the converted electrical signal and up-converting the converted electrical signal into a broadband signal when the received optical signal is a baseband signal; converting the up-converted electrical signal according to a predetermined broadband communication standard; and amplifying the converted electrical signal to transmit a wireless frequency signal.

The method may further include amplifying the received signal to transmit a wireless frequency signal when the received signal is a mobile communication network signal.

Also, the method may further include: externally receiving at least one wireless signal; analyzing the received wireless signal, and demodulating the received wireless signal according to a predetermined broadband communication standard and down-converting the wireless signal into a baseband signal when the wireless signal is a broadband signal; converting the down-converted signal into an optical signal; and transmitting the converted optical signal through an optical fiber bundle. Furthermore, the method may further include amplifying the received signal, converting the amplified signal into an optical signal, and transmitting the optical signal through an optical fiber bundle when the received signal is a mobile communication network signal.

Advantageous Effects

As described above, the present invention provides a method and device for separating and converting multiband signals.

Also, according to the present invention, multiband signals can be separated and converted using optical communication networks. Furthermore, service regions can expand to, for example, WLAN, Wibro/4G, satellite digital multimedia broadcasting (DMB), and UWB services, irrespective of the format of input/output signals. In addition, the method and device according to the present invention can wirelessly transceive broadband data using conventional wired networks and provide multiband wireless services.

DESCRIPTION OF MAJOR SYMBOLS IN THE ABOVE FIGURES

Figure 1:
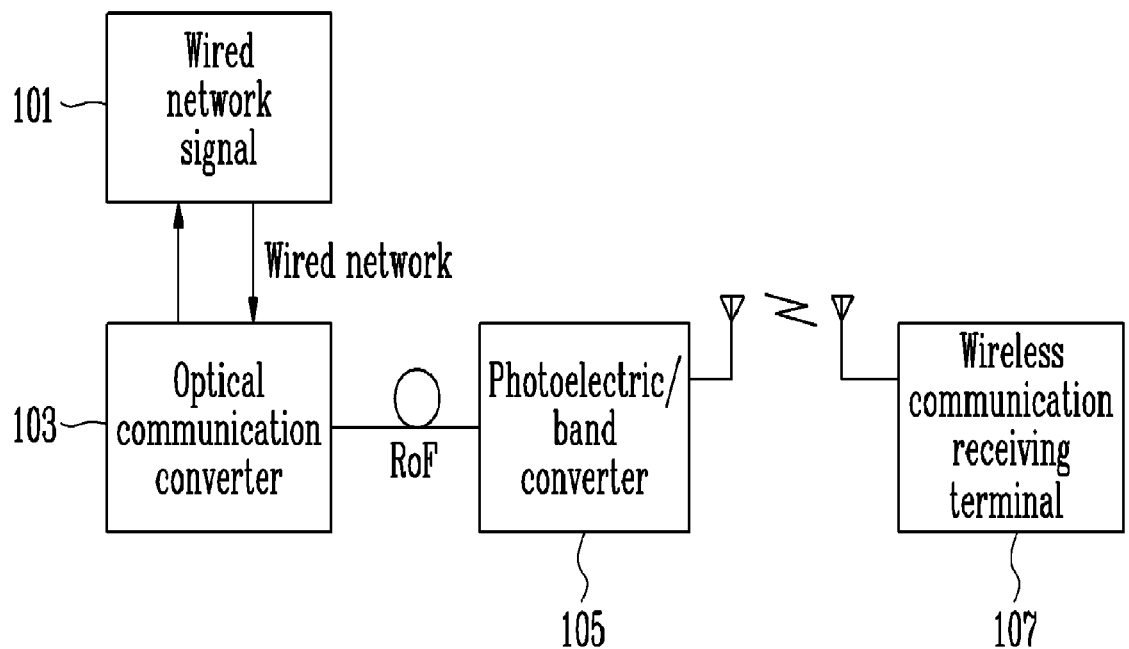
FIG. 1 is a view showing the construction of a network using a multiband signal separation/conversion device according to an exemplary embodiment of the present invention.

201: optic fiber
203: photoelectric converter
205: first switch
207: first mobile communication band-pass amplifier
209: broadband up-converter
211: first broadband amplifier
213: second switch
215: transceiver
217: second broadband amplifier
219: second mobile communication band-pass amplifier
221: broadband down-converter
223: electro-optical converter

MODE FOR THE INVENTION

A method and device for separating and converting multiband signals according to the present invention will be described more fully hereinafter with reference to the accompanying drawings, in which exemplary embodiments of the invention are shown.

In the present invention, a broadband signal comprehensively refers to a millimeter-wave signal. In particular, in an embodiment of the present invention, a millimeter-wave signal may refer to a 60-GHz signal on which a standardization task is performed. Also, a mobile communication network signal according to the present invention refers to a radio-frequency (RF) signal in the frequency range of about 1 to 3 GHz, which includes all frequency ranges used in personal communication services (PCS), $2^{nd}$, $3^{rd}$, and $4^{th}$-generation mobile communication networks, wireless LAN (WLAN), Wibro, digital multimedia broadcasting (DMB) services, and ultra-wide band (UWB) services.

Also, a baseband signal refers to a sub-radio-frequency signal. The baseband signal may be a signal received and transmitted by wire or a signal containing actual data.

FIG. 1 is a view showing the construction of a network using a multiband signal separation/conversion device according to an exemplary embodiment of the present invention.

Referring to FIG. 1, in a wireless communication system to which the present invention is applied, a wired network signal 101, which is a data signal generated by a wired network, is transmitted to an optical communication converter 103 via the wired network. The wired network utilizes conventional telephone networks and coaxial networks or wired subscriber networks. The optical communication converter 103 converts the data signal transmitted via the wired network into an optical signal and transmits the optical signal in a radio on fiber (RoF). The transmission of signals via optical fibers is advantageous for transmitting a large amount of data.

A converter 105 converts the transmitted RoF data signal into a wireless signal and a receiving terminal 107 receives the wireless signal and performs a final communication. In the conventional method, transmitted data signals are converted into wireless signals using different converters according to different communication methods. However, in a communication technique using a broadband signal, if applying the converter 105 according to the present invention to the above-described wired network including the wired network signal 101 and the optical communication converter 103, it is possible to separate a broadband signal and a conventional mobile communication network signal, convert each of the broadband signal and the mobile communication network signal into an appropriate frequency signal, and communicate the signals.

In this case, each of the broadband data signal and the mobile communication signal, which are converted to optical signal by optical communication converter 103 are amplified, and converted into a wireless signal according to their own characteristics, and communicated with the receiving terminal 107 appropriate for each band. Thus, We can use a conventional wired network even in the broadband environment.

Figure 2:
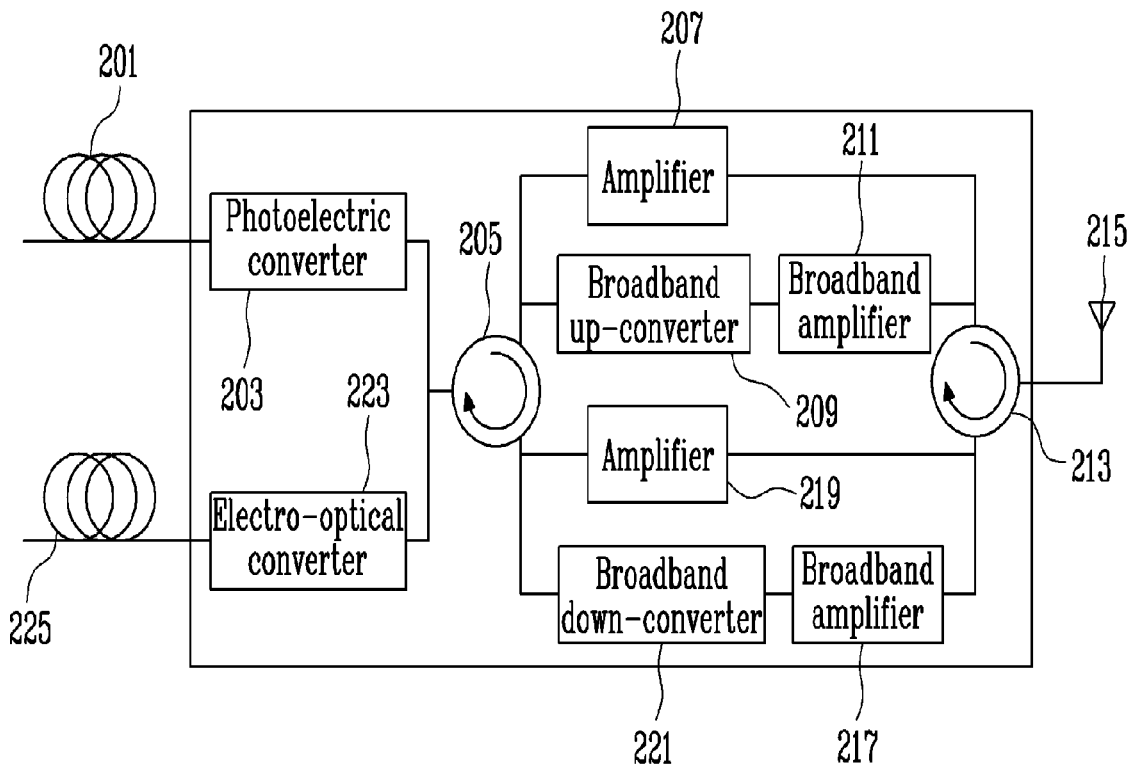
FIG. 2 is a view showing the construction of a multiband signal separation/conversion device according to an exemplary embodiment of the present invention.

FIG. 2 is a view showing the construction of a multiband signal separation/conversion device according to an exemplary embodiment of the present invention.

Referring to FIG. 2, the device according to the present invention includes a photoelectric converter 203, an electro-optical converter 223, a first switch 205, a second switch 213, a first mobile communication band-pass amplifier 207, a second mobile communication band-pass amplifier 219, a broadband up-converter 209, a broadband down-converter 221, a first broadband amplifier 211, a second broadband amplifier 217, and a transceiver 215.

The photoelectric converter 203 converts an optical signal transmitted via an optical fiber 201 into an electrical signal. Although an optical signal can transmit a vast amount of data via the optical fiber 201, the optical signal itself cannot undergo a complicated conversion process. In particular, since a final terminal uses a wireless communication interface, a converter for converting an optical signal into an electrical signal is required to convert wireless communication signals.

Also, the electro-optical converter 223 converts an electrical signal into an optical signal in order to transmit an externally received electrical signal to an optical communication network.

The first switch 205 separates an electrical signal converted by the photoelectric converter 203 into a mobile communication network signal and a broadband signal according to a frequency characteristic or a data format. Also, the first switch 205 receives a mobile communication network signal or a broadband signal from a receiving terminal and transmits the mobile communication network signal or the broadband signal to the electro-optical converter 223.

The first switch 205 analyzes the header of an input signal or examines a packet to analyze the characteristic of the input signal. Also, the first switch 205 separates signals according to the characteristics or frequencies of the signals.

Also, the second switch 213 analyzes the received signal and transmits the signal to the transceiver 215. Alternatively, the second switch 213 separates signals received from the transceiver 215 according to the characteristics of the signals.

The first mobile communication band-pass amplifier 207 amplifies a mobile communication network signal received from the first switch 205. When the first mobile communication band-pass amplifier 207 receives the mobile communication network signal, the first mobile communication band-pass amplifier 207 need only amplify the received signal and transmit the amplified signal without modulating the signal or converting the frequency of the signal.

Also, the second mobile communication band-pass amplifier 219 amplifies the mobile communication network signal received from the second switch 213.

When the broadband up-converter 209 receives a signal used for a broadband, the broadband up-converter 209 up-converts the signal into a broadband signal appropriate for broadband wireless communications. The signal used for a broadband of optical communication signals transmitted from external optical fibers is typically a baseband data signal. Accordingly, unlike the already modulated and transmitted mobile communication network signal, the signal used for the broadband must be up-converted into the broadband signal.

In particular, in a specific broadband frequency range in which a standardization task is currently performed, the broadband up-converter 209 modulates the baseband data signal according to a predetermined standardized format.

Also, when the broadband down-converter 221 receives a broadband wireless signal, the broadband down-converter 221 down-converts the received signal into a baseband signal such that only a data signal is extracted from the received signal. Also, the broadband down-converter 221 demodulates the broadband signal to restore data.

The first broadband amplifier 211 amplifies the broadband signal output from the broadband up-converter 209. Also, the second broadband amplifier 217 amplifies the received broadband signal.

The transceiver 215 converts a signal transmitted from the second switch 213 into a wireless signal, externally transmits the wireless signal, and transmits an externally received wireless signal to the second switch 213. Although the type of the transceiver 215 may depend on a frequency characteristic of each signal, the type of the transceiver 215 is not essential in the present invention and thus, a description thereof will be omitted here.

Figure 3:
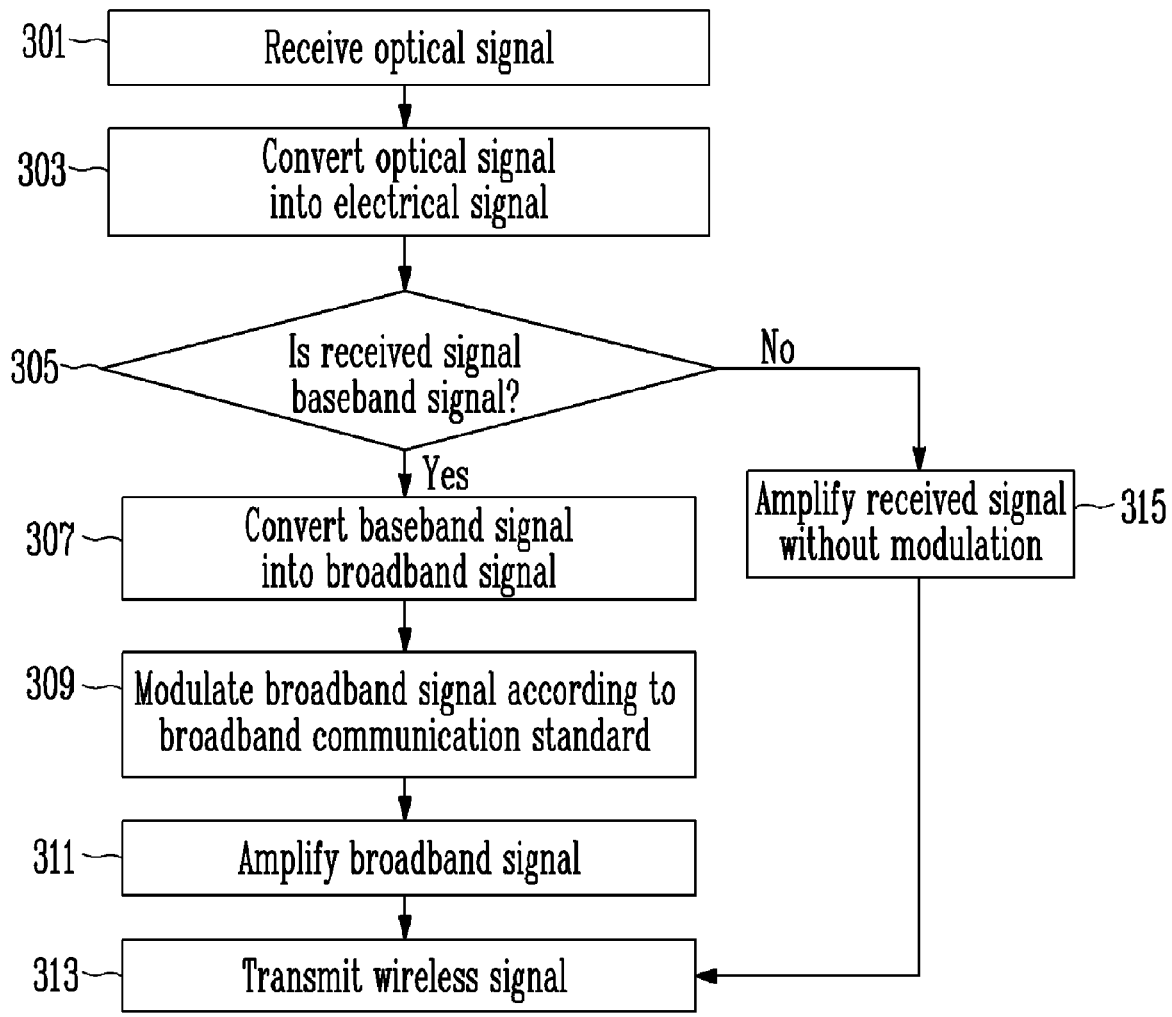
FIG. 3 is a flowchart of a method of separating and converting a multiband signal according to an exemplary embodiment of the present invention.

FIG. 3 is a flowchart of a method of separating and converting a multiband signal according to an exemplary embodiment of the present invention.

Referring to FIG. 3, initially, an optical signal is externally received in step 301. In step 303, the optical signal is converted into an electrical signal in order to process the received optical signal.

In step 305, a data packet or frequency of the electrical signal is analyzed to determine if the received optical signal is a baseband signal or a mobile communication network signal. When the received optical signal is a baseband signal, the electrical signal is up-converted into a broadband signal in step 307 and modulated on a standard format used for the broadband signal in step 309.

Thereafter, in step 311, the frequency of the broadband signal is amplified to increase the amplitude of the broadband signal in order to transmit the modulated signal. In step 313, the amplified signal is transmitted as a wireless signal.

Meanwhile, when it is determined that the optical signal received in step 301 is a mobile communication network signal, the received signal is amplified without modulating or converting the frequency of the received signal in step 315 and externally transmitted in step 313.

In the above-described process, the received optical signal is separated and converted according to a frequency characteristic and transmitted as a wireless communication signal. A wireless signal, which is received in the reverse order to the above-described flowchart, is converted into an optical signal and transmitted to a wired network.

Figure 4:
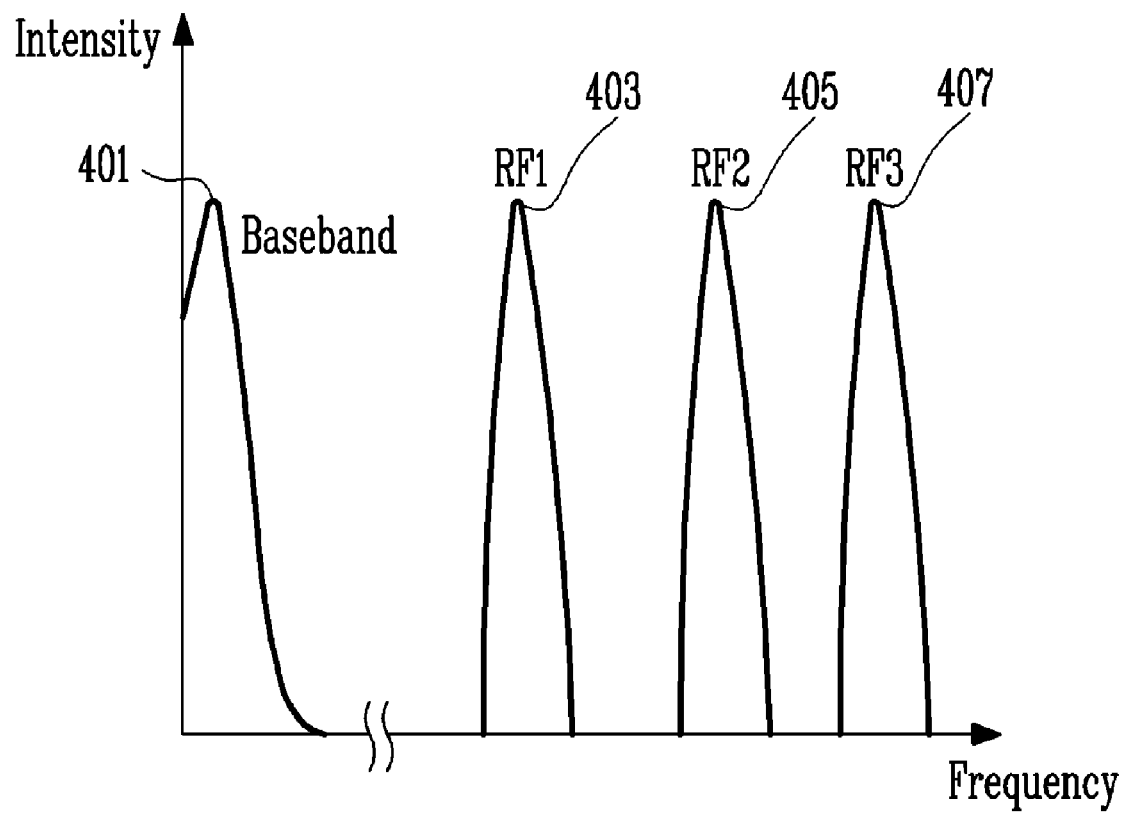
FIGS. 4 and 5 are graphs showing processes performed before and after a process of converting signals according to an exemplary embodiment of the present invention.
Figure 5:
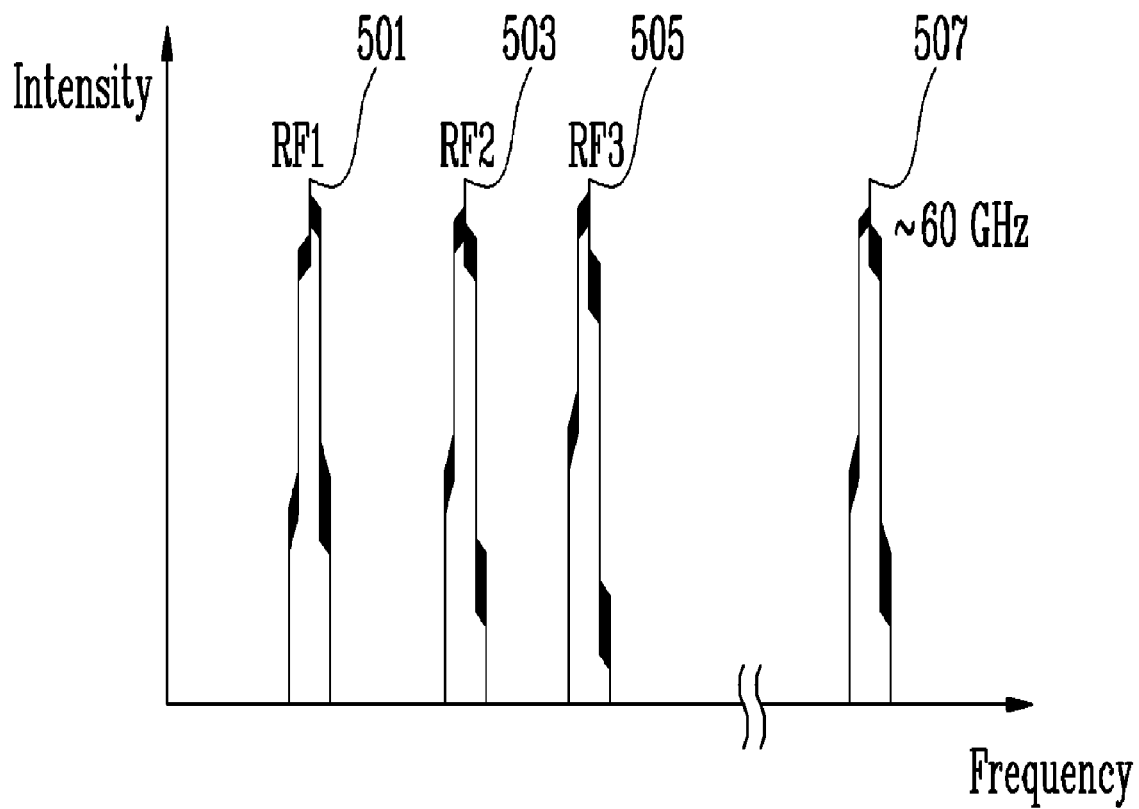

FIGS. 4 and 5 are graphs showing processes performed before and after a process of converting signals according to an exemplary embodiment of the present invention.

FIG. 4 is a graph of the intensity of an input signal with respect to the frequency of the input signal.

Referring to FIG. 4, the input signal is separated into a baseband signal 401 and mobile communication network signals 403, 405, and 407. As described above, a baseband signal is a sub-RF signal containing actual data.

The mobile communication network signals 403, 405, and 407 have various spectra as shown in FIG. 4 because various frequencies are used in the band for mobile communication networks according to respective communication service standards. For example, PCS and wideband code division multiple access (WCDMA) services are currently provided in a frequency range of 800 MHz to 2 GHz. Thus, the mobile communication network signals 403, 405, and 407 can have various spectra as can be seen from FIG. 4.

FIG. 5 is a graph of the intensity of a multiband signal with respect to the frequency of the multiband signal after the multiband signal is separated and converted.

Referring to FIG. 5, the frequency of mobile communication network signals 501, 503, and 505 is not varied. However, it can be seen that the baseband signal 401 shown in FIG. 4 is gone and a new signal 507 occurs in the broadband.

As described above, the device according to the present invention modulates a mobile communication network signal using a conventional method and directly transmits the modulated signal, while the device receives a baseband signal, up-converts the baseband signal into a broadband signal, modulates the baseband signal, and transmits the broadband signal.

The above description is reversely applied when the device according to the present invention receives a wireless signal.

Figure 6:
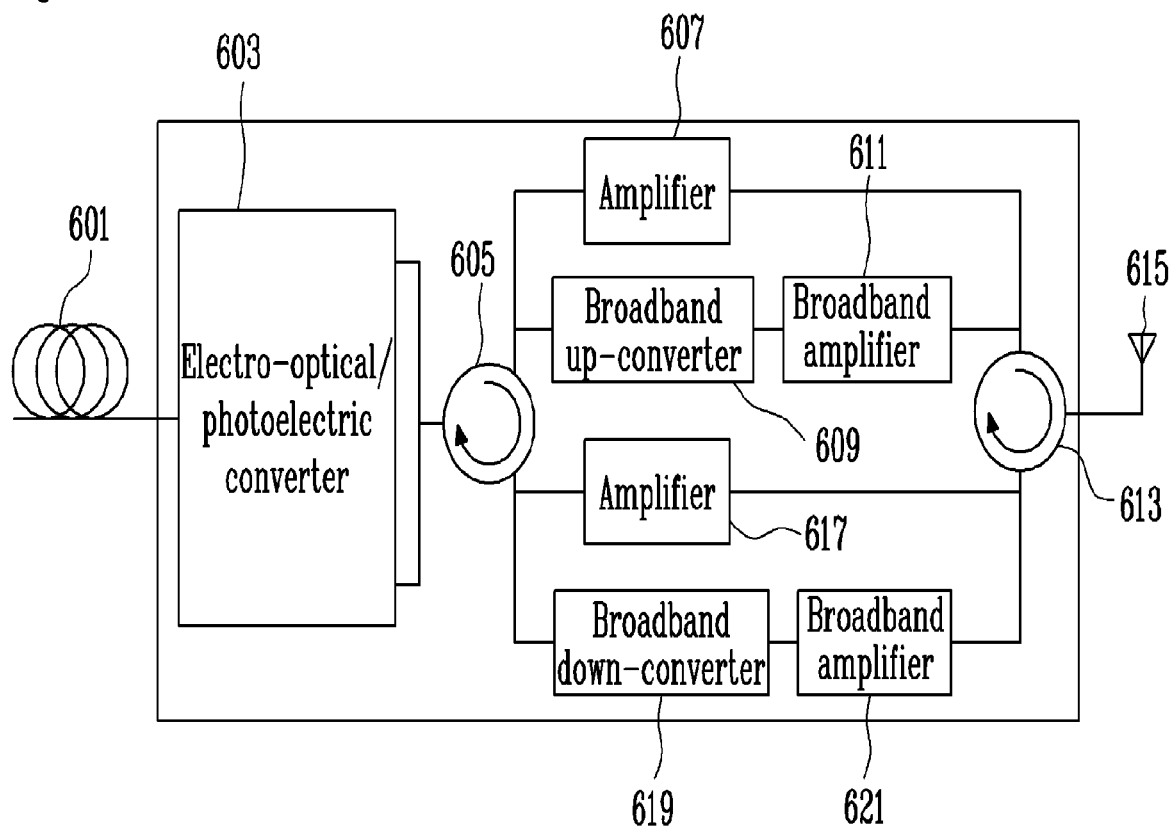
FIG. 6 is a view showing the construction of a multiband signal separation/conversion device according to another exemplary embodiment of the present invention.

FIG. 6 is a view showing the construction of a multiband signal separation/conversion device according to another embodiment of the present invention.

The device shown in FIG. 6 has generally the same construction as the device shown in FIG. 2. Specifically, the device shown in FIG. 6 includes a first switch 605, a second switch 613, a first mobile communication band-pass amplifier 607, a second mobile communication band-pass amplifier 617, a broadband up-converter 609, a broadband down-converter 619, a first broadband amplifier 611, a second broadband amplifier 621, and a transceiver 615. However, in the device shown in FIG. 6, the photoelectric converter and the electro-optical converter shown in FIG. 2 are combined into an electro-optical/photoelectric converter 603 so that an optical signal can be received and transmitted via a single optical fiber signal line 601. Specifically, the electro-optical/photoelectric converter 603 may be embodied by installing an optical duplexer at front ends of the photoelectric converter and the electro-optical converter shown in FIG. 2.

Since the device shown in FIG. 6 can communicate signals using the single optical fiber signal line 601, the fabrication cost can be reduced.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A multiband signal separation/conversion device comprising:
   a photoelectric converter for converting an externally received optical signal into an electrical signal;
   a first switch for separating the converted electrical signal into signals according to frequency bands;
   a first mobile communication band-pass amplifier for amplifying a mobile communication network signal of the signals separated by the first switch;
   a broadband up-converter for up-converting a baseband signal of the signals separated by the first switch into a broadband signal and outputting the broadband signal;
   a first broadband amplifier for amplifying the broadband signal output from the broadband up-converter; and
   a transmitter for wirelessly transmitting the signals amplified by the first mobile communication band-pass amplifier and the first broadband amplifier.

2. The device according to claim 1, further comprising:
   a receiver for externally receiving a multiband wireless signal;
   a second switch for separating the signal received by the receiver into signals according to frequency bands;
   a second mobile communication band-pass amplifier for amplifying a mobile communication network signal of the signals separated by the second switch;
   a second broadband amplifier for amplifying a broadband signal of the signals separated by the second switch;
   a broadband down-converter for down-converting the broadband signal amplified by the second broadband amplifier into a baseband signal; and
   an electro-optical converter for converting the amplified baseband signal and the amplified mobile communication network signal into an optical signal.

3. The device according to claim 2, wherein the receiver and the transmitter transmit and receive signals through a single antenna using a duplexer.

4. The device according to claim 2, wherein the second switch analyzes the signal received by the receiver and divides the signal received by the receiver into the separated signals according to a predetermined data format.

5. The device according to claim 2, wherein the broadband down-converter demodulates the broadband signal amplified by the second broadband amplifier according to a predetermined broadband standard.

6. The device according to claim 2, wherein the first switch is a first circulator and the second switch is a second circulator.

7. The device according to claim 2, wherein both the optical signal received by the photoelectric converter and the optical signal transmitted from the electro-optical converter are input or output through a same optical fiber bundle using an optical duplexer.

8. The device according to claim 1, wherein the first switch analyzes the received signal and divides the received signal into the signals according to a predetermined data format.

9. The device according to claim 1, wherein the first mobile communication band-pass amplifier increases only the amplitude of the mobile communication network signal of the signals separated by the first switch.

10. The device according to claim 1, wherein the broadband up-converter upconverts the baseband signal by modulating the baseband signal according to a predetermined broadband standard.

11. The device according to claim 1, wherein the first switch is a circulator.

12. The device according to claim 1, wherein the first mobile communication band-pass amplifier only receives the mobile communication network signal of the signals separated by the first switch and not the baseband signal of the signals separated by the first switch, and the broadband up-converter receives only the baseband signal of the signals separated by the first switch and not the mobile communication network signal of the signals separated by the first switch.

13. A method of separating and converting a multiband signal, comprising:
   externally receiving at least one optical signal;
   converting the received optical signal into an electrical signal;
   analyzing the converted electrical signal to determine if the converted electrical signal is a baseband signal or a mobile communication network signal;
   up-converting the converted electrical signal into a broadband signal when the received optical signal is determined to be a baseband signal;
   converting the up-converted electrical signal according to a predetermined broadband communication standard; and
   amplifying the electrical signal converted according to the predetermined broadband standard to transmit a wireless frequency signal.

14. The method according to claim 13, further comprising amplifying the electrical signal to transmit a wireless frequency signal when in analyzing the converted electrical signal, the signal is determined to be the mobile communication network signal.

15. The method according to claim 13, further comprising:
   externally receiving a wireless signal;
   analyzing the received wireless signal to determine if the received wireless signal is a broadband signal or a mobile communication network signal;
   down-converting and demodulating the received wireless signal, according to a predetermined broadband communication standard, into a baseband signal when the wireless signal is determined to be the broadband signal;

converting the down-converted and demodulated signal into an optical signal; and transmitting the converted optical signal through an optical fiber bundle.

16. The method according to claim 15, further comprising:

amplifying the received wireless signal when the received wireless signal is determined to be the mobile communication network signal;

converting the amplified wireless signal into another optical signal; and transmitting the converted another optical signal through an optical fiber bundle.

17. The method according to claim 15, wherein in analyzing the converted electrical signal, a first circulator analyzes the converted electrical signal to determine if the converted electrical signal is the baseband signal or the mobile communication network signal, and wherein in analyzing the received wireless signal, a second circulator analyzes the received wireless signal to determine if the received wireless signal is the broadband signal or the mobile communication network signal.

18. The method according to claim 13, wherein in analyzing the converted electrical signal, a circulator analyzes the converted electrical signal to determine if the converted electrical signal is the baseband signal or the mobile communication network signal.

* * * * *